UNITED STATES PATENT OFFICE.

RICARDO REYES, OF MEXICO, MEXICO.

PROCESS FOR SEPARATION OF GOLD AND SILVER FROM MINERALS.

1,243,976. Specification of Letters Patent. Patented Oct. 23, 1917.

No Drawing. Application filed November 9, 1914. Serial No. 871,186.

*To all whom it may concern:*

Be it known that I, RICARDO REYES, citizen of the United Mexican States, residing at Mexico city, Mexico, have invented a new and useful Improvement in a New and Useful Process for Separation of Gold and Silver from Minerals, of which the following is a specification.

My invention relates to a new and useful process for separating gold and silver and like metals from minerals which contain these metals by employing chlorid of sodium which is decomposed by an electric current in order to obtain by this means nascent chlorin and chlorid of silver and gold. Upon these metals being dissolved by contact with the nascent chlorin, these chlorids are precipitated in a metallic state upon contact with the metal or carbon bodies used as electrodes. These metals adhere to the metal or carbon bodies mentioned, as may be desired; and are later separated from the electrodes by means already known, as by filing, scraping or melting.

This process can be carried out in the following way: A tank of wood or other suitable material is manufactured. This tank being either round or square. Into it two or more bars, either of metal or carbon are placed, within the circumference or along the sides of the tank in such manner as to serve as electrodes, one electrode being positive and the other negative. A solution of chlorid of sodium in natural water is prepared in the proportion necessary for each mineral, according to the proportion of gold or silver which it may contain. This sodium chlorid in itself has no chemical action on the metals or their salts. The mineral, which it is desired to treat is to be converted into fine powder, by any suitable known means. When this has been done, the mineral or ore is deposited in the tanks together with the solution of chlorid of sodium in the proportion necessary to the quantity of mineral, which is to be treated. As soon as the solution comes in contact with the mineral, the whole mass must be agitated by means of compressed air or any mechanical agitator. The agitation may be made with compressed air by means of a hose which discharges air at the bottom of the tank, in order that the solution shall be well agitated. When the solution is agitated the electric current which is sent through the metal or carbon electrodes, with the intensity which may be required in order to decompose chlorid of sodium into nascent chlorin, and sodium, which in the presence of water forms sodium hydrate.

I also desire to state that any change or modification in the quantity of chlorid of sodium, or in the disposition or number of the poles and in general in everything which does not touch the substance of my invention, may be made without departing from the spirit of my invention.

By means of this process the extraction of gold, silver and like metals from their chlorids or like salts in which the electro-positive element when liberated ordinarily attacks the metal deposited upon the cathode is much cheapened, as amalgamating tanks and the like are no longer needed.

The object of my invention having been described, I claim as follows:

1. A process for separating gold and silver and like metals from their minerals, consisting in adding the mineral in a finely divided condition to a solution of sodium chlorid, and passing an electric current between electrodes, immersed in the mixture, through the mixture, whereby the said metals are deposited in their metallic condition upon the cathode.

2. A process for separating gold and silver and like metals from their minerals, consisting in adding the mineral in a finely divided condition to a solution of sodium chlorid, and passing an electric current between electrodes, immersed in the mixture, through the mixture, whereby the said metals are deposited in their metallic condition upon the cathode, the said mixture being agitated during the passage of said electric current.

3. A process for separating gold and silver and like metals from their minerals, consisting in adding the mineral in a finely divided condition to a solution of sodium chlorid, and passing an electric current between electrodes, immersed in the mixture, through the mixture, whereby the said metals are deposited in their metallic condition upon the cathode, the said mixture being agitated during the passage of said electric current by discharging gases in an upward direction at the lower layers of the mixture.

4. A process for separating gold, silver, and like metals, from their minerals, which consists in immersing said minerals in the solution of a salt, and passing an electric current through said solution, by means of electrodes immersed therein, said salt, when electrolyzed, being capable of yielding an anion that combines with said metals of said minerals to form salts soluble in the solvent of said first mentioned salt, the said first mentioned salt having no chemical action upon said metals.

5. In the art of separating gold, silver, and like metals from their minerals, that step in the art which consists in transforming said metals into soluble salts, capable of being electrolytically decomposed, by immersing said minerals in a solution of a salt, having no chemical effect on said metals and passing an electric current through said solution by means of electrodes immersed therein, the said metals being deposited in the metallic condition upon the cathode immersed in said solution, said salt being electrolyzed by said current simultaneously with the deposit of said metals on said cathode when electrolyzed yielding an anion which combines with the said metals to form said first mentioned salts soluble in the solvent of said second mentioned salt, and being electrolyzed by said current simultaneously with the said deposit of said metals on said cathode.

6. A process for separating gold and silver and like metals from their minerals, which consists in treating a suspension of said minerals with nascent chlorin to form the chlorids of said metals, said minerals being immersed in a solvent for said chlorids through which the said chlorin is passed, and simultaneously passing an electric current through said solvent by means of electrodes immersed therein, the said metals being deposited by said current upon the cathode simultaneously with the action of the said nascent chlorin upon said minerals.

In testimony whereof, I affix my signature in presence of two witnesses.

RICARDO REYES.

Witnesses:
F. B. SILVA,
MAJ. GAYUALP.

Copies of this patent may be obtained for five cents each, by addressing the "Commissioner of Patents, Washington, D. C."